United States Patent [19]
Kohan

[11] Patent Number: 5,975,696
[45] Date of Patent: Nov. 2, 1999

[54] PROCESS FOR RENDERING PLASTIC SUBSTRATE PHOTOCHROMIC

[76] Inventor: George Kohan, 16139 Chief Dr., Hudson, Fla. 34667

[21] Appl. No.: 08/854,495

[22] Filed: May 12, 1997

[51] Int. Cl.$^6$ ....................................................... G02C 7/10
[52] U.S. Cl. ............................................ 351/177; 351/163
[58] Field of Search ..................................... 351/162, 163, 351/166, 165, 177

[56] References Cited

U.S. PATENT DOCUMENTS 5,552,090  9/1996  Van Gemert et al. ................... 252/586
5,576,055  11/1996  Tagaya et al. ........................... 427/162

*Primary Examiner*—Scott J. Sugarman
*Attorney, Agent, or Firm*—Pendorf & Cutliff

[57] ABSTRACT

Methods for quickly and inexpensively producing photochromic non-prescription (e.g., sunglasses, safety glasses, reading glasses, etc.), prescription, multifocal and progressive plastic optical quality eyeglass, and more particularly, a simple and inexpensive yet rapid and high quality method for rendering one or both surfaces of a lens photochromic. The invention further concerns lenses produced by the method. The method comprises providing a layer of a polar liquid in a vessel, dissolving a photochromic dye in a non-polar solvent having a lower specific gravity than a polar liquid to form a dye carrier, providing a photochromic dye dissolved in non-polar solvent into a vessel as a distinct upper layer on top of a polar liquid lower layer to form a two-layer bath; immersing a lens to be rendered photochromic into a bath such that at least part of a lens passes through the upper layer, into the lower layer, and back out through the upper layer, drying the lens to evaporate solvent and form a deposit of photochromic dye on the lens, and heat treating the lens to cause the deposited dye to firmly adhere to the lens.

15 Claims, No Drawings

1

PROCESS FOR RENDERING PLASTIC SUBSTRATE PHOTOCHROMIC

FIELD OF THE INVENTION

The present invention concerns methods for quickly and inexpensively producing photochromic non-prescription (e.g., sunglasses, safety glasses, reading glasses, etc.), prescription, multifocal and progressive plastic optical quality eyeglass. The present invention is more particularly concerned with a simple and inexpensive yet rapid and high quality method for rendering one or both surfaces of a lens photochromic. The invention further concerns lenses produced by the method. The lenses are characterized by an extremely rapid photochromic response.

BACKGROUND OF THE INVENTION

Photochromic ophthalmic lenses made of mineral glass are well known. Photochromic dyes have good compatibility with mineral glass. The most common complaints about photochromic mineral glass lenses concern the weight of the lenses and the slow photochromic reaction time, particularly the change from dark lenses to light lenses.

Unlike the lens industry of years ago when lenses were made only from glass, now spectacle lenses are made from many different types of plastic or from glass-plastic composites. Plastics include acrylic, PPMA (a product of PPG-Pittsburgh Plate Glass) also known as CR-39®, and Lexan® (a polycarbonate made by General Electric).

Recently, attempts have been made to apply photochromic dyes to light-weight plastic lenses to render them similarly photochromic. However, for various reasons this objective has not been satisfactorily achieved with plastic lenses. One reason for the lack of success has to do with the chemistry of ethylene glycol diallyl dicarbonate, the most commonly used monomer for producing plastic ophthalmic lenses. This monomer is cast in a lens mold and polymerized with a catalyst such as isopropyl percarbonate. One might expect that a plastic lens made from such a monomer could be rendered photochromic simply by incorporating photochromic dyes into the monomer composition prior to casting the lens. However, in practice it was found that, following polymerization of the organic material, the photochromic dyes did not retain their photochromic property. Apparently, the catalyst required for the polymerization caused inhibition of the dyes. Thus, it has not been possible in practice to simply incorporate photochromic dyes into the monomer composition when making ophthalmic lenses from an organic material.

Advances have recently been made on two fronts in materials and methods for the on-site production of prescription lenses: advances designed to reduce the amount of stock materials which must be carried on hand, and advances in reduction of the time needed to produce the prescription lenses. However, none of these approaches has made it possible to produce plastic photochromic prescription lenses. Further, none of the available methods permits the lens crafter to utilize simple stock lenses, yet offer a wide variety of photochromic properties, tinting, UV protection, scratch resistance, and other desirable properties. Further yet, none of the available methods or materials makes possible the provision of photochromic lenses having an extremely rapid photochromic response rate.

A typical approach to on-site custom lens production involves casting an additional plastic layer onto a plastic lens blank. See, for example, in U.S. Pat. No. 2,339,433 (Staehle) disclosing a method of adding a correction to a molded plastic lens by adding a thin level of resin. U.S. Pat. No. 3,248,460 also discloses means for casting plastic lenses from thermosetting or thermoplastic materials wherein a plastic blank having significantly less curvature than required for the full intended prescription of the lens is used as a base. An additional layer of material is cast onto this base. The patent employs a conventional optical gasket to provide space between the plastic blank and the mold and to hold the resin material in the cavity created thereby. The additional layer of material changes the curvature of the resulting lens over the vast majority of its surface, thereby changing the prescription of the resulting finished lens to the power required. The material is cured by heat. Such a heat curing process requires heating over a period of more than 12 hours, thus making the formation of the lens a long, drawn-out process. Obviously, photochromic lenses could not be produced from such materials and methods.

Others have tried to manufacture multifocal or progressive plastic lens using a lamination technique. Such a technique joins a preformed plastic section, referred to as a wafer, to a matching cured plastic prescription lens. The preformed wafer section defining a multifocal or progressive region of the finished lens is joined to the prescription lens by adhesive. The adhesive for bonding the two lens components is the same monomer used to cast the lens components. Accordingly, no provision is made for incorporation of photochromic dyes.

U.S. Pat. No. 5,462,698 (Kobayakawa, et al.) entitled "Photochromic Composition" addresses the problems associated with specific photochromic compounds which tend to be slow-acting or inactive when incorporated in plastic, and solves the problem by use of a resin compound having at least one epoxy group in the molecule as the resin for forming the photochromic lens. Kobayakawa, et al. (a) is directed to forming a lens having photochromic compound disbursed throughout, (b) requires the presence of multiple types of photochromic compounds in combination, (c) requires the use of a polymerizable compound having at least one epoxy group to form the lens, (d) requires polymerization in a heat furnace, with polymerization taking from 2 to 40 hours, and (e) reports fading time to ½ density measured after exposure to 60 seconds averaging 3 minutes (Table 1). Kobayakawa, et al. thus requires a long time to produce a specific type of slow acting lens.

More recently, U.S. Pat. No. 5,531,940 (Gupta et al.) teaches methods for making optical plastics lenses with photochromic additives. According to a first embodiment of the invention, a casting resin having a low cross link density comprising polymerizable components (preferably including up to 50 wt % bisallyl carbonate) and photochromic additives, wherein all polymerizable components have a functionality not greater than two, is arranged between a mold and a lens preform and then cured. Upon polymerization the resin has a low cross-link density and forms a soft matrix. This soft matrix is unsuitable as the outer layer for photochromic lenses. According to a second embodiment of the invention, the casting resin but substantially free of photochromic additives is arranged between a mold and a lens preform and then cured. The resin is then impregnated with photochromic additives. In a third embodiment, the layering resin containing a photochromic additive is provided on the surface of a mold and cured to a gel state. Then, a casting resin that is substantially free of photochromic additives is arranged between the coated mold and a lens preform and cured. According to a fourth embodiment, a casting resin that is substantially free of photochromic additives is provided on the surface of a mold and cured to a gel state. Then, a casting resin containing photochromic additives is arranged between the coated mold and a lens preform and cured. There is no discussion of photochromic rate of reversal, and the photochromic material is represented as being too soft to expose to the environment. Further, the process is complex, time consuming, and requires a high degree of attention.

Accordingly, it has not been possible previously to simply coat a lens with a photochromic material and thereby render the lens photochromic. Even if a coating composition had been available for rendering lenses photochromic, the requirement for forming a very even coating has in the past required certain precise coating techniques in the lens manufacturing industry. For example, U.S. Pat. No. 4,267,208 (Ireland) teaches coating of the convex side of an optical lens for blocking purposes by immersing the downwardly facing convex side in a liquid coating material in a can, upwardly withdrawing the lens above the level of the coating material but below the lip of the can, and spinning the lens about its vertically disposed axis to spread the coating material by centrifugal force as a uniformly thin film over the convex side, to create an edge buildup of coating material to form a thickened bead-like peripheral or rim portion at the periphery of the convex side, and to spin-off excess coating material against the inside of the can for reuse. Upon spin-off of excess coating material the lens is withdrawn out of the can whereupon the film on the spinning lens dries sufficiently for handling. To facilitate the lens coating operation, the lens is held on its concave side by a suction cup having the upper end of its vibration damping stem chucked in the drive shaft of a hand-held motor. To further facilitate the lens coating operation, a releasable vacuum source is operatively associated with the suction cup to pick up a lens for immersing and spinning and to release the suction cup from the lens without handling of the lens. Accordingly, complex apparatus and operations are required to form a coating layer on a lens.

U.S. Pat. No. 5,164,228 (Peralta, et. al.) also teaches the coating of a plastic ophthalmic lens with a scratch-resistant coating using a spin coating process.

There is thus a need for a method for applying a photochromic coating onto non-prescription or prescription ophthalmic lenses, which method would enable any optometrist to easily, quickly, and effectively custom produce photochromic plastic lenses, which lenses may also be tinted, UV-protective, and scratch resistant as required by the customer.

SUMMARY OF THE INVENTION

Following lengthy experimentation with conventional coating techniques, the present inventor surprisingly discovered a method by which a field of ultra fine photochromic crystals (barely visible to the naked eye) can be provided evenly over a surface of an optical lens and then fixed to the optical lens surface without interfering with the photochromic properties. This technique enables any optometrist to quickly and inexpensively render any of non-prescription (e.g., sunglasses, safety glasses, reading glasses, etc.), prescription, multifocal and progressive plastic optical quality lenses photochromic.

The coating method produces lenses characterized by an extremely rapid photochromic response, i.e., a near complete photochromic transition in either direction in about 30 seconds or less.

The present invention was made after years of unsuccessful attempts to improve over the conventional coating techniques. Various attempts using dry coating, powder coating, hot immerse coating, oil based coating, and other techniques did not yield satisfactory results. While experimenting, the inventor immersed a piece of plastic in a container containing a layer solvent in which photochromic monomer was dissolved, the layer of solvent floating on top of several inches of water. Surprisingly, the plastic exhibited a more even layer of photochromic crystals than had hitherto been possible by immersing lenses into homogeneous solvent/dye baths. The reason for this phenomena is not understood, but it is clear that the water has some form of interaction with the solvent and the lens surface, causing the monomer to spread evenly over the lens.

Accordingly, it is a feature of the present invention that the known spin coating or homogeneous immersion coating techniques are replaced by immersing into a bath containing a layer of solvent and photochromic dye floating on top of a dissimilar fluid, preferably a polar fluid, most preferably water.

Further, it became possible to apply multiple thin layers of photochromic coating onto the lens, thereby forming a controlled gradient.

Since the photochromic layer is provided on or near the front surface of the lens, i.e., on surface of the lens most exposed to UV radiation, the photochromic layer tends to have greater sensitivity to changes in ambient radiation. That is, many lenses, particularly those designed to be worn outdoors, include UV absorbers to block damaging UV rays from reaching the retina. UV absorbers naturally absorb UV radiation, and in doing so interfere with and retard the photochromic action of the lens which wherein the photochromic dyes are designed to react to UV radiation. The lens coated according to the present invention tends to have a rapid reaction rate, even if the photochromic layer is overcoated with a UV protective layer.

The ease and rapidity of the coating technique allows delivery of prescription photochromic lenses upon request and without having the patient wait a significant time. This is obviously a tremendous commercial advantage.

DETAILED DESCRIPTION OF THE INVENTION

The present inventor extensively experimented with materials for coating ophthalmic lenses, and has filed several patent applications on proprietary coating materials. However, until the present invention, he had used the industry accepted conventional tedious, messy, laborious coating techniques. These techniques included casting of photochromic monomer using two glass molds. This involved taking a mold, superposing a matching lens over the mold to form a thin uniform cavity, injecting a proprietary photochromic monomer into this cavity, and curing. The inventor also worked with laminating a photochromic wafer onto another substrate. Further, the inventor worked on a coating technique using multiple spin coatings, but results were not always satisfactory.

The inventor was not satisfied with the conventional coating techniques, which were always a tricky and time-consuming part of the photochromic lens making process. The inventor felt a need for a method for evenly coating plastic ophthalmic lenses, particularly CR 39® stock lenses, or lenses of any other substrate from stock, any thickness, any prescription, bifocal, trifocal or progressive with a photochromic material.

After all the previous unsuccessful attempts, the present invention finally and surprisingly enabled the inventor to quickly form an even coating of photochromic material on a lens. After a ten minute thermal cure, the lens formed by the method produced a nearly clear residual state indoors and, upon going outdoors, turned into, e.g., a two shade. Other lenses were coated so as to have, e.g., a lightly pigmented shade indoors, and upon going out turned into a three shade.

The invention is not particularly limited to any one color. The most requested colors tend to be gray and brown, but it is equally possible to produce, e.g., optic yellow, green, blue or purple.

The basis of the invention is the use of a two layer bath rather than the conventional homogeneous bath. To those working in this art, the immersion bath according to the invention looks like something that should be discarded because it doesn't mix. That is, there is a clear liquid on the bottom, usually water, and a different layer on top, which is a mixture of a solvent such as styrene (for purposes of the present invention, even though styrene may be a polymerizable monomer, styrene is used as a solvent) or other solvent such as toluene and photochromic dyes discussed in greater detail below. The presence of such a discontinuity is contrary to the conventional wisdom which requires well mixed ingredients for forming an immersion bath.

When a lens is immersed according to the present invention, it is highly preferred that the surface or surfaces being coated are not in contact with the device carrying the lens. That is, if the front surface is being coated, a rubber vacuum nozzle may be attached to the back surface of the lens. If both surfaces are being coated, it is preferred that a gripper be used to hold only the edges of the lens without holding the sides of the lens. In practice, it has been found preferable to hold the lens by its edges even if only one surface of the lens is being coated. If the lens is merely coated and laid down, the solvent and dye composition may flow during drying, forming a slightly darker rim around the edge of a convex-up drying lens, or forming a darker center in the case of a concave-up drying lens. If the lens is laid against it's side, there may be a darker rim at the contact point. Accordingly, to avoid possible problems and guarantee even drying, it is preferred to use a device which grips the lenses only at their edges and hangs the lenses up to dry. Hang lenses in the air has been found to virtually guarantee lens drying free of dark rims, most likely because the solvent will evaporate evenly over the entire surface of the lens.

The invention is surprising. The present inventor had been working with dip coating by immersing the lens to be coated in a homogeneous bath of solvent and photochromic dye, and had been finding that the coating tended to be spotty and runny and an even distribution of photochromic dye could not be achieved with any degree of reliability to be commercially useful. In contrast, in accordance with the present invention, when a lens is passed first through the solvent and thereafter into the water, the effect of the water pressure and the repelling forces between the solvent (e.g., styrene, toluene, etc.) and water somehow causes the solvent and photochromic dye to be picked up and evenly dispersed over the lens surface. Then when the lens exits the water and passes back through the solvent layer, the solvent repels the water as the lens passes through the water/solvent interface. Perhaps the solvent has an effect on repulsion of water causing an even distribution of dye. It has been observed that the styrene loaded with photochromic material rushes to the surface of the lens and adheres to it, suggesting some sort of a molecular attraction. When pulling the lens up out of the water and through the dye/solvent layer—it does not seem to matter at what speed the lens is pulled up—the photochromic dyes spread out over the lens surface perfectly and evenly so that there will be an absence of any spotting or streaking.

The present inventor does not wish to be limited by any theory of operation, and offers these explanations based merely on observation. Future work may investigate the physico-chemical mechanism. For the purposes of the present invention an understanding of the mechanism is not necessary, it is sufficient to know that the two layer system evenly distributes the crystals over both convex and concave surfaces.

During the drying step the solvent evaporates and it can be observed that the photochromic dye forms small, barely visible crystals on the surface of the lens. As the lens is heated at 325° F.–375° F. for 5–10 minutes, the dye crystals appear to remain on the surface of the lens and not to be absorbed into the lens material. The unique feature of the lens is the even distribution of highly active photochromic crystals over the surface of the lens, with such good adherence that no overcoating layer is needed.

The reason that this discovery is important is that the inventor was seeking a method simple enough to be capable of being carried out in any small retail optometrist office. Space and expense of equipment are limiting factors in such an office. Such an office will be able to afford a small temperature and time controlled thermal convection oven. If a customer requests photochromic treatment of his lenses, the optometrist may have ready baths of, e.g., optic yellow, gray, brown, and green, a total of four baths. The optometrist manufactures the ophthalmic lens in a conventional manner or takes an off-the-shelf lens, immerses the lens into the baths as necessary to form the desired color and tint intensity, hangs the thus coated lens in a convection oven for 5–10 minutes at 325–375° F., and the lens is finished. The optometrist may begin with a pair of scratch resistant CR 39® polycarbonate lenses, which are inexpensive off-the-shelf lenses, treat them in accordance with the present invention to render them photochromic, and sell the lenses at a very good profit because they are now photochromic.

Yet another desirable economical feature of the invention resides in the ability to minimize the amount of material which needs to be prepared and kept in readiness. Photochromic dyes are very expensive. The present invention makes it possible to float a few ounces of composition in a bath, which would ordinarily be filled with approximately 32 ounces. Since only a small amount of the composition is required, an ophthalmologist may invest in a series of exotic colors, enabling him to have a different bath ready for every different color that may want to offer to tint. The amount of composition floating on top of the water is not particularly limited. Once the amount of composition is nearly used up, the business owner can order or add composition. Accordingly, the present invention greatly cuts down on the amount of dye and dye waste.

Since certain colors are produced by combining different amounts of dyes, a few baths may be used to produce a broad range of colors. The dye supplier may provide the optometrist or ophthalmologist with a color chart teaching what dyes, in what orders and what combinations, produce certain photochromic end colors. For example, the instruction may read immerse in blue once and yellow twice to produce a green tint. This is a more economical system than preparing separate blue, yellow and green baths, and is only possible because of the extremely good and even coating which results from the present invention.

Thus, a person who has had no experience whatsoever in the optical industry needs merely to place a lens in a lens holder, immerse it in the appropriate bath or baths, and place the lens in the precisely timed convection oven. The result is a perfect lens every time. Until the present invention had been made the very idea that such a simple and reliable system could be made was ludicrous. Others in the industry have invested large amounts of money trying to figure out how to produce an even coating, and have had to provide a soft photochromic coating which had to be baked for many hours and subsequently be cleaned and coated with a hard coat for scratch resistance. The present invention does not require a hard coat.

The present invention provides an in-office system capable of treating any polycarbonate, CR 39®, or high index lenses right off the shelf to provide lenses in any desired color available. These are the hardest scratch resistant lenses in the market. These lenses are available today in most larger chains. The present invention makes it possible to treat uneven surfaces, e.g., bifocals, trifocal, progressive, with no problem. A device which can grasp two lenses can be used as a "double holder" to immerse and hang both lenses for a given pair of glasses at the same time, and they're done. Now all a patient needs is just one pair of glasses compared to the conventional clear pair and the permanent sunglasses.

In accordance with the present method there is no waste whatsoever. There is no evaporation of the water because it is covered by the solvent layer. The lens retailer would never have to throw the water away, unless they somehow contaminated the water. The lens retailer would be able to completely use up the styrene and photochromic material. Experiments have shown that a layer of solvent material as thin as 1/16 of an inch produces good results. All the retailer needs to do, if the level of solvent composition is nearing depletion, is simply add solvent composition to it to bring the level up again. The solvent composition should last forever, and should be capable of treating a large number of lenses.

The coating material is preferably formulated in a ratio of 1 gram of solids (dyes) and 2 ounces of the solvent (e.g., styrene, toluene, etc.). Since the photochromic dyes are not water soluble, they remain in the solvent which floats on the water. It appears that the molecular attraction/repulsion between the solvent, dye, water and lens material seems to cause the solvent and dye to repel water, and water to cause the solvent to go on evenly. That is, the lens first goes down through the solvent solution so that it will have a multi-molecular layer of dye and solvent. Without the water according to the present invention, the coating layer will not be even. Surprisingly, after immersion in water, even coatings and perfect lenses are produced every time.

It is also possible to take the CR 39® or polycarbonate or high index substrate and gradually immerse, e.g., only half the lens through the hydrophobic layer and then bring it back up. When the lens is taken out of the convection oven after 10 minutes at 350° F. the product is a lens with one half which is photochromic and one half which is non-photochromic, a gradient photochromic tint. Depending on the skill of the technician, he can make any variety of color combinations and intensities over any segment of the lens. It is all up to the skill of that operator.

Although the present invention is applicable to glass lenses, the use of plastics for eyeglasses is desirable due to their light weight and durability. Plastic lenses also provide relatively economic vision correction. Methods for producing plastic lenses of various prescriptions are well known, and need not be discussed herein. The coating technique of the present invention has been found to work with every plastic lens with which it has been tested, including lenses of diethylene glycol diallyl carbonate (DAC), marketed by AKZO Chemicals, Inc. of Dobsferry, N.Y. and PPG Industries, Inc. of Pittsburgh, Pa. under the trademarks NOURYSET 200™ and CR-39™, respectively. The present invention can be applied to any other preformed "plastic" optical lens regardless of the composition or manner in which such lens was formed. As used herein a "plastic" lens is simply one fashioned from optical quality resin materials. Such materials include without limitation mixtures containing allyl diglycol carbonates (such as "MasterCast 1" and "MasterCast 2" which are trademarks of Vision Sciences, Monrovia, Calif.; and "CR-39" which is a trademark of PPG Industries), allylic esters such as triallyl cyanurate, triallyl phosphate, triallyl citrate, diallyphenyl phosphonate, acrylic esters, acrylates, methyl, allyl and butyl methacrylates, polycarbonates, styrenics, LEXAN, polyesters such as those formed of ethylene glycol maleate, and other liquid monomer/polymer materials having high indices of refraction (such as HiRi which is a trademark of PPG Industries). Preferred resin compositions include allyl diglycol carbonates, allylic esters, triallyl cyanurate, triallyl phosphate, triallyl citrate, diallyl phenyl phosphonate, acrylic esters, acrylates, methyl methacrylate, allyl methacrylate, butyl methacrylate, polycarbonates, styrenics, LEXAN, polyesters, high index plastics, medium index plastics, urethanes, epoxies and silicones.

Photochromic compounds which can be used in the present invention include any reversible photochromic compounds as employed in this art, and examples thereof include naphthopyran compounds and other photochromic compounds as taught in U.S. Pat. Nos. 5,458,815; 5,458,814; 5,466,398; 5,384,077; 5,451,344; 5,429,774; 5,411,679; 5,405,958; 5,381,193; 5,369,158; 5,340,857; 5,274,132; 5,244,602; 4,679,918; 4,556,605; and 4,498,919, the disclosures of these patents being incorporated herein by reference.

In accordance with the present invention, the layer of photochromic dyes may be provided on the front face of the ophthalmic lens, the back surface, or both. So as not to compromise the speed of the photochromic reaction, any agent which is capable of filtering ultraviolet rays as preferably not incorporated externally of the layer containing the photochromic dyes, but is either mixed into the layer containing the photochromic dyes or is provided rearward the layer containing the photochromic dyes.

The photochromic material must contain as a minimum a photochromic dye dispersed in a monomeric composition which acts as a solvent and is selected so as not to inhibit the photochromic properties of the photochromic dye following polymerization. The photochromic material may additionally contain an adhesion promoter, one or more tints, a UV absorber, and other components which are conventionally employed in the industry and which would not interfere with the distribution of the photochromic dye on the lens. However, due to the excellent distribution and bonding produced by the present invention, no further components are required.

EXAMPLES

Example 1

In this Example a thin photochromic layer was formed on the front surface of a stock CR-39 lens. As the photochromic dye, Reversacal Plum Red, which is a trade name of Keystone Annalee Corporation, was employed. The on gram of photochromic dye was dissolved in two ounces of toluene in a sterile 6 oz. plastic beaker at room temperature. The solution was filtered through a 5 micron filter. The resulting coating composition was poured into a 32 ounce container on top of 16 ounces of water at room temperature. A conventional lens holder was used to grasp a lens by the edges, and the lens was immersed through the coating material into the water and back out through the coating material. The coated lens had an even dye distribution. The lens was allowed to air dry at which time the dye crystallized into barely visible crystals evenly distributed over the surface of the lens. The lens was placed into a 350° F. convection oven for 10 minutes and removed. The dye crystals were firmly adhered to the surface of the lens.

When exposed to UV radiation the time required to darken the lens is approximately 5 seconds. This is surprising, given that the time for measuring lens darkening of conventional lenses is given in minutes. It is presumed that this effect is attributable to the photochromic dyes being in the form of crystals and present at the very front of the lens as compared to conventional photochromic lenses wherein dyes are distributed throughout the lens or behind a UV absorptive layer.

Example 2

The procedure according to Example 1 was repeated, except that the toluene solvent was replaced with dichloromethane, chloroform, dimethylformamide, isopropyl alcohol and acetone. The dye was less soluble in the alcohol and acetone, but was adequately dissolved and distributed. Excellent results were obtained.

Example 3

The procedure of Example 1 was repeated, except that a glass lens, a polycarbonate lens, and a high index material lens, respectively, was used in place of CR 39®. Excellent dye distribution and adherence were observed.

Example 4

The procedure of Example 1 was repeated, except that various naphthopyran compounds as taught in U.S. Pat. No. 5,458,815 were used in place of Reversacal Plum Red.

One of the lenses produced in Example 4 was further lightly tinted to adjust the residual or inactive state photochromic color to be desired shade. To achieve a brown active state, the lens was tinted for 1 second in Chemko Pink followed by immersing for four seconds in Chemko Dark Brown at 90–95° C., followed by rinsing and cleaning. This lens, tinted with non-photochromic water soluble dyes, produced a lens which was darker than a mere photochromic lens, and had an acceptable attractive color. The lens is darker than a lens which would normally be worn indoors, but was perfect for use as a sunglasses lens. If it is subsequently decided that the tint is too dark, then the lens may be immersed into tricresyl phosphate at 350° F. for about one minute or less to neutralize the color.

Any worker in this art, having the photochromic lenses according to the present invention at hand, would be able to further tint the lenses to produce a range of sun glass colors and darknesses by either adding dye into one or more of the non-photochromic or photochromic layers according to the invention, or by tinting the photochromic lens in an aqueous tint bath to impregnate water soluble dyes into the photochromic or other lens layer.

The above examples were presented in order to illustrate the invention and are not intended to limit the invention in any way. Those working in the art would readily appreciate that substantial modifications within the scope of the invention may be made to the illustrative embodiments.

The term ophthalmic lens as used herein is intended to mean any lens of a optical quality transparent material intended to be worn by the user. The term can refer to reading glasses, non- prescription sun glasses, safety glasses, driving glasses, etc. and is not limited to prescription glasses.

Although the system was first designed for providing a method of rendering prescription plastic lenses photochromic, the invention has been described in great detail using a CR-39 lens by way of example, it will be readily apparent that the process is capable of application to related applications, such sun glasses, safety glasses, driving glasses, etc., and is thus capable of use in a number of other applications. Although this invention has been described in its preferred form with a certain degree of particularity with respect to modification of a CR-39 lens, it is understood that the present disclosure of the preferred form has been made only by way of example and that numerous changes in the details of structures and the composition of the system may be resorted to without departing from the spirit and scope of the invention.

What is claimed is:

1. A method for treating a lens surface to render it photochromic, said method comprising:

providing a layer of a polar liquid in a vessel;

dissolving a photochromic dye in a non-polar solvent having a lower specific gravity than said polar liquid to form a coating material;

providing said photochromic dye dissolved in non-polar solvent into said vessel as a distinct upper layer on top of said polar liquid lower layer to form a two-layer immersion bath;

immersing and removing a lens, the surface of which is to be rendered photochromic, into and from said bath such that at least part of said lens passes first through said upper layer, into said lower layer, and then back out through said upper layer for dispersion of said photochromic dye over said lens surface;

subjecting said lens to drying to evaporate solvent and form a deposit of photochromic dye on said lens; and heat treating said lens to cause said deposited dye to firmly adhere to said lens.

2. A method as in claim 1, wherein said non-polar solvent is selected from the group consisting of toluene, dichloromethane, chloroform, dimethylformamide, isopropyl alcohol, and acetone, and mixtures thereof.

3. A method as in claim 1, wherein the composition of the lens is selected from the group of optical quality resin materials consisting of diethylene glycol diallyl carbonate, allyl diglycol carbonates, allylic esters, acrylic esters, acrylates, methyl, allyl and butyl methacrylates, polycarbonates, styrenics, polyesters, allyl diglycol carbonates, triallyl cyanurate, triallyl phosphate, triallyl citrate, diallyl phenyl phosphonate, urethanes, epoxies and silicones.

4. A method as in claim 3, wherein said optical quality resin is a polycarbonate resin.

5. A method as in claim 3, wherein said optical resin comprises allyl diglycol carbonate.

6. A method as in claim 1, wherein said photochromic dye is a reversible photochromic naphthopyran compound.

7. A method as in claim 1, wherein said photochromic dye is dissolved or dispersed in a styrenic monomer.

8. A method as in claim 7, wherein said lens is tinted.

9. A method as in claim 1, wherein said heat treating is performed at a temperature of 250° F. to 400° F. for a time of from 3 minutes to 20 minutes.

10. A method as in claim 9, wherein said heat treating is performed at a temperature of 300° F. to 375° F. for a time of from 5 minutes to 15 minutes.

11. A method as in claim 1, wherein during said immersing step said lens passes completely through said upper layer into said lower layer and back through said upper layer.

12. A method as in claim 1, wherein said polar liquid is water.

13. A method as in claim 1, further comprising tinting said lens in non-photochromic tint, followed by immersed into tricresyl phosphate at 350° F. for two minutes or less to neutralize the color.

14. A photochromic lens formed by the method of claim 1 and characterized by an even distribution of fine photochromic dye crystals baked onto at least one surface of said lens.

15. A photochromic lens produced by a process comprising providing a layer of a polar liquid in a vessel;

dissolving a photochromic dye in a non-polar solvent having a lower specific gravity than said polar liquid to form a coating material;

providing said photochromic dye dissolved in non-polar solvent into said vessel as a distinct upper layer on top of said polar liquid lower layer to form a two-layer immersion bath;

immersing a lens to be rendered photochromic into said bath such that at least part of said lens passes through said upper layer, into said lower layer, and back out through said upper layer for dispersion of said photochromic dye over said lens;

subjecting said lens to drying to evaporate solvent and form a deposit of photochromic dye on said lens; and heat treating said lens to cause said deposited dye to firmly adhere to said lens.

* * * * *